United States Patent [19]

Inouye

[11] 4,068,267

[45] Jan. 10, 1978

[54] MAGNETIC DISK STORAGE APPARATUS IN WHICH SERVO TRACK ZONE PROVIDES SIGNALS FOR BOTH MOVING SPEED AND POSITION OF TRANSDUCER

[75] Inventor: Yuji Inouye, Kawasaki, Japan

[73] Assignee: Fujitsu Ltd., Kawasaki, Japan

[21] Appl. No.: 730,583

[22] Filed: Oct. 7, 1976

[30] Foreign Application Priority Data

Oct. 9, 1975    Japan .............................. 50-122336

[51] Int. Cl.² .................... G11B 21/10; G11B 5/012
[52] U.S. Cl. ...................................... 360/75; 360/77;
    360/98; 360/135
[58] Field of Search ......................... 360/75, 77–78,
    360/135, 109, 97–98

[56] References Cited

U.S. PATENT DOCUMENTS

| 3,864,741 | 2/1975 | Schwarz | 360/77 |
| 3,893,180 | 7/1975 | Braun et al. | 360/77 |
| 3,994,016 | 11/1976 | Moghadam | 360/78 |
| 4,030,132 | 6/1977 | Iftikar et al. | 360/77 |
| 4,032,984 | 6/1977 | Kaser et al. | 360/77 |

Primary Examiner—Alfred H. Eddleman
Attorney, Agent, or Firm—Staas & Halsey

[57]    ABSTRACT

A magnetic disk storage apparatus having a servo disk and a servo transducer cooperating therewith is described. The servo disk is provided with a magnetically pre-recorded concentric arrangement comprising of an inner guard zone, a servo track zone, and an outer guard zone. The servo track zone provides information regarding both the moving speed and the position of the servo transducer; while at least one of the inner or outer guard zones provides information regarding both the moving speed and the guard zone of the servo transducer.

18 Claims, 18 Drawing Figures

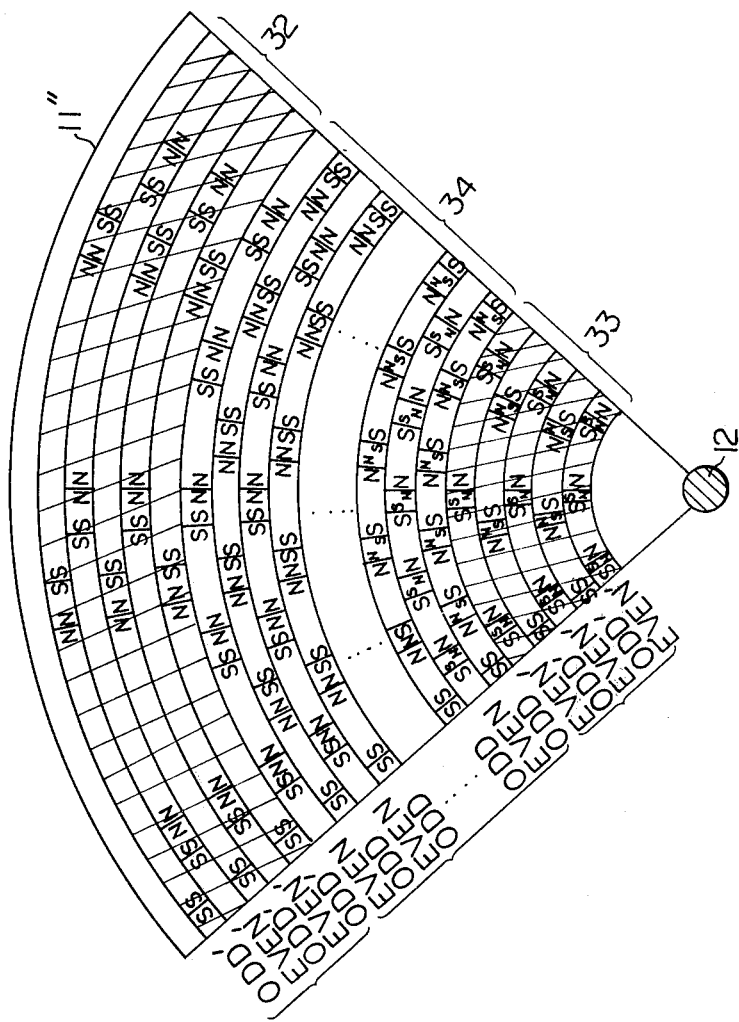

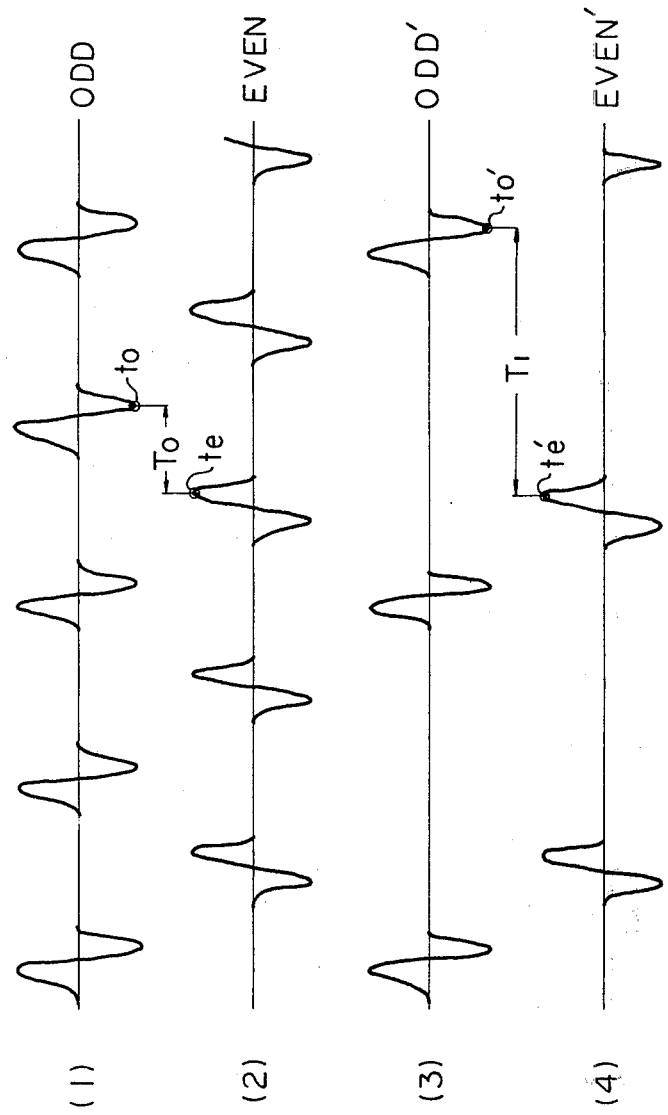

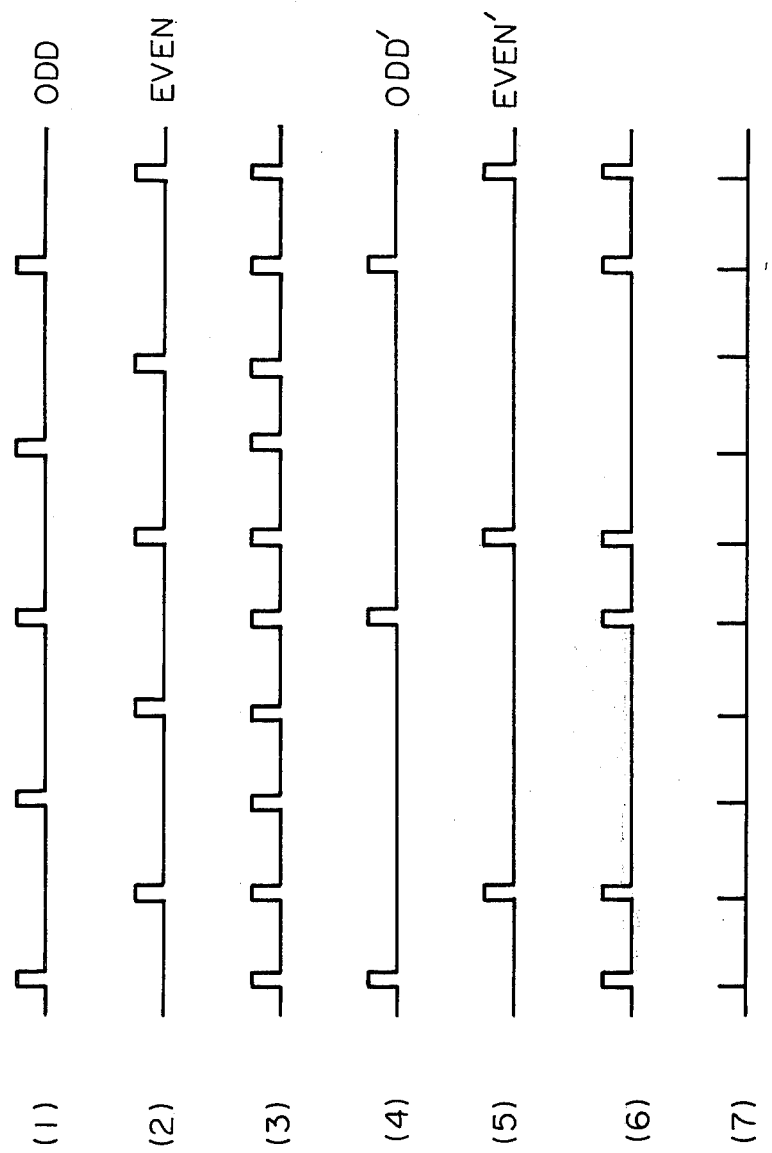

MAGNETIC DISK STORAGE APPARATUS IN WHICH SERVO TRACK ZONE PROVIDES SIGNALS FOR BOTH MOVING SPEED AND POSITION OF TRANSDUCER

The present invention relates to a magnetic disk storage apparatus, and more particularly to a servo system which mechanically drives transducers in the magnetic disk storage apparatus.

The magnetic disk storage apparatus is mainly comprised of a stack of magnetic disks, a plurality of transducers each of which cooperates electromagnetically with the corresponding magnetic disk, a linear motor which moves the transducers with respect to the magnetic disks, and a controlling circuit which controls the linear motor so as to move the transducers to a desired position on the magnetic disks in accordance with a command from a central processing unit (CPU). Of the magnetic disks, one of them is usually utilized as a servo disk and the others are utilized as data disks. Accordingly, said servo system is comprised of said servo disk, said transducer cooperating with said servo disk, said linear motor and said controlling circuit. The transducer cooperating with said servo disk (hereinafter called a servo transducer) is coarsely controlled by the linear motor toward a desired position on said servo disk at a predetermined control speed under the servo control. After this, the servo transducer is finely or precisely controlled to the desired position.

As mentioned above, the servo transducer is coarsely moved toward a desired position with a predetermined control speed; therefore, it is required to detect the moving speed of said servo transducer. When the detected moving speed deviates from predetermined control speed, the servo circuits control the linear motor so as to make the moving speed equal to the predetermined control speed.

In the prior art, the moving speed of the servo transducer is detected by means of a tachometer comprised of a moving magnet and a stationary coil which is attached to the rear portion of the linear motor. However, this type of tachometer is not suitable for detecting the moving speed of the servo transducer precisely, because: firstly, its application is expensive; secondly, since it is a mechanical detecting device, the detecting signal includes harmful vibrating components for servo control; thirdly, since it is connected to the servo transducer by means of a mechanically resilient member, the moving speed of the servo transducer fixed at one end of the resilient member is not absolutely equal to the moving speed detected by the tachometer which is fixed at the other end of the resilient member.

Accordingly, in recent years, proposals have been made concerning a method for detecting the moving speed of the servo transducer by utilizing the servo information recorded in the servo disk, and thus, without using the tachometer. When the servo transducer moves with respect to and slightly above the servo disk, the servo transducer produces a position signal by reading said servo information. The servo information is recorded on every servo track of the servo disk, wherein a great number of servo tracks are concentrically arranged on the surface of said servo disk. Said position signal produced from the servo transducer is typically a triangular wave signal. Since the position signal changes linearly in accordance with the changes of the movement of the servo transducer, the moving speed of the servo transducer is obtained by differentiating the position signal which corresponds to the derivative of the position signal $(y)$ with respect to time $(t)$ that is $dy/dt$. Thus, the moving speed of the servo transducer is obtained without using the tachometer.

As will be mentioned hereinafter in detail, the servo disk should further include an inner guard zone which is arranged inside and concentrically with said servo tracks, and an outer guard zone which is arranged outside and concentrically with said servo tracks. Both the inner guard zone and the outer guard zone are provided for preventing the servo transducer from running away from the servo tracks by accident, and further for indicating the zero position for the servo tracks, wherein the inner guard zone stores guard information and the outer guard zone also stores guard information. If the servo signals pre-recorded magnetically on the guard zone have only one pattern, it will be impossible to obtain a moving speed of the servo transducer by differentiating the position signal from the servo transducer when the servo transducer moves above the inner guard zone or the outer guard zone, because the result of differentiation always should be zero. In order to overcome this difficulty, the following method for detecting the moving speed of the servo transducer when it is on the guard zone has been proposed. By the way, the moving speed of the servo transducer can be obtained by integrating an acceleration of the servo transducer. And, since the acceleration of the servo transducer is proportional to the value of the driving current in the linear motor, the moving speed of the servo transducer can be detected by integrating said driving current by means of an electronic integrator. However, the electronic integrator usually cannot integrate the driving current with high accuracy due to the occurrence of a drift or offset current in the electronic integrator. Consequently, although it may be possible to obtain a moving speed of the servo transducer when said transducer moves above the inner guard zone or the outer guard zone, obtaining a moving speed with high accuracy still remains difficult.

Therefore, it is an object of the present invention to provide a magnetic disk storage apparatus in which the inner guard zone and/or the outer guard zone have both servo information and guard information at the same time, and thereby a moving speed of said servo transducer can be obtained not only when said servo transducer moves above said servo tracks, but also above said inner guard zone and/or said outer guard zone.

The present invention will be more apparent from the ensuing description with reference to the accompanying drawings wherein.

Figure 3:
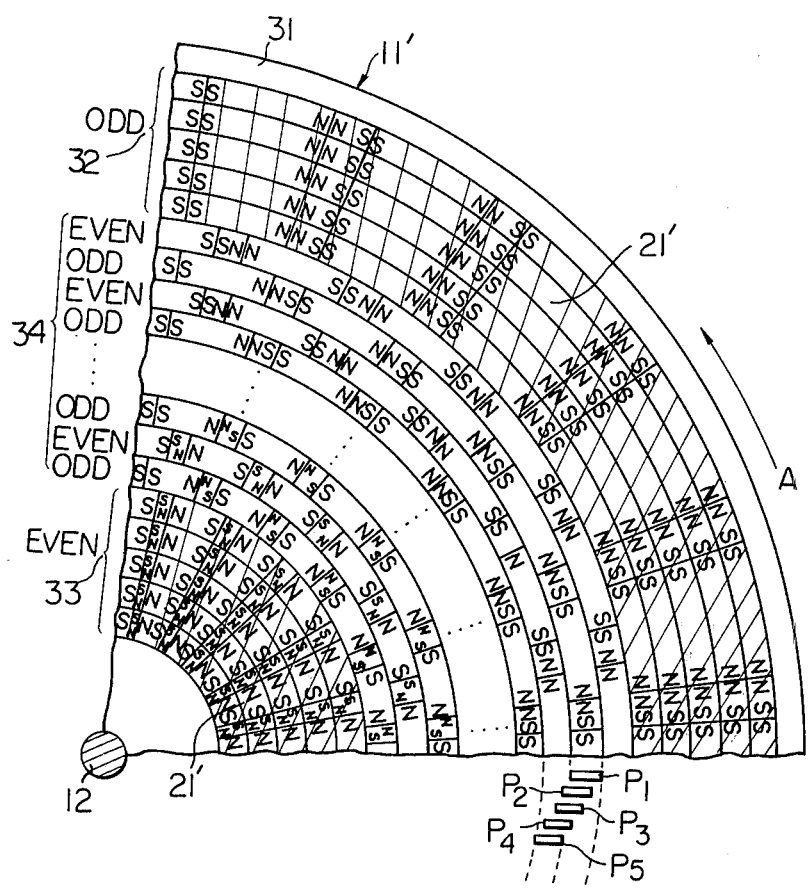
FIG. 3 is an enlarged plan view, partially cut away, of the conventional servo disk.
Figure 5:
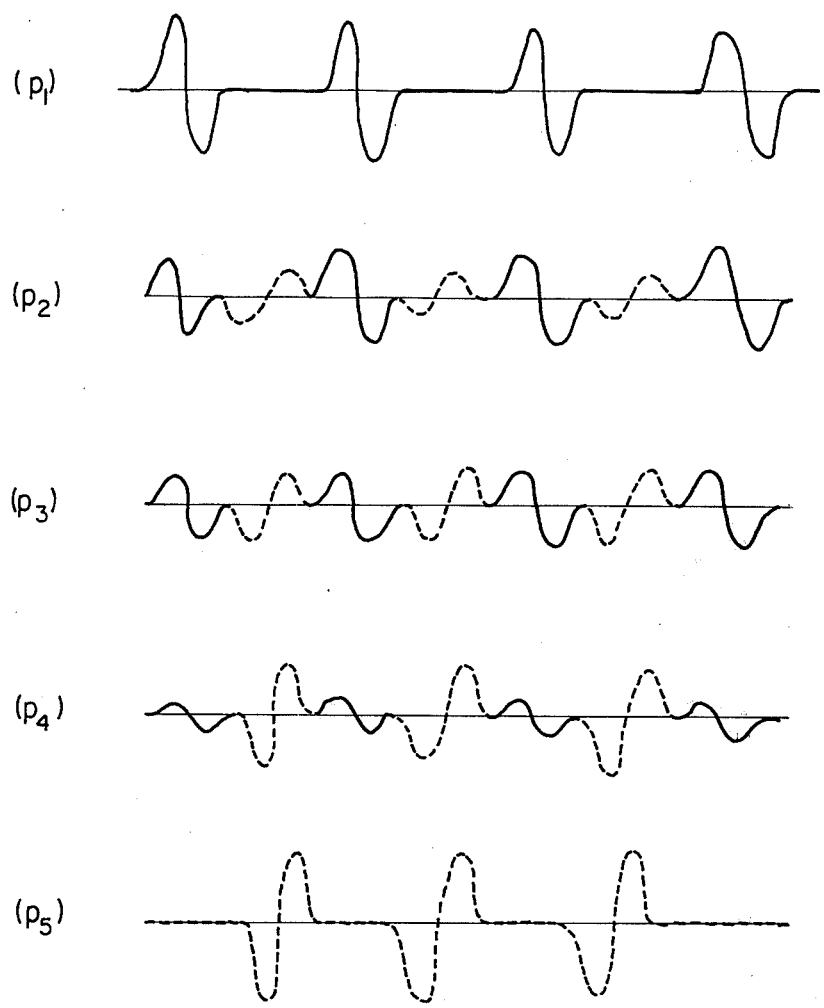
Figure 6:
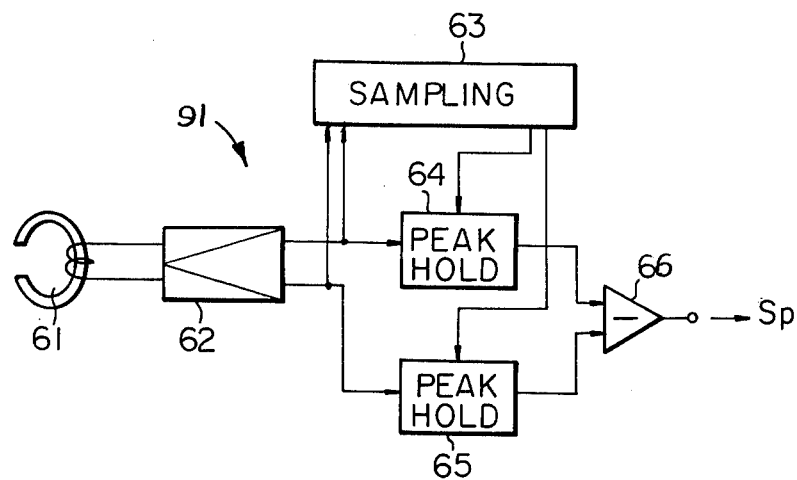
Figure 7:
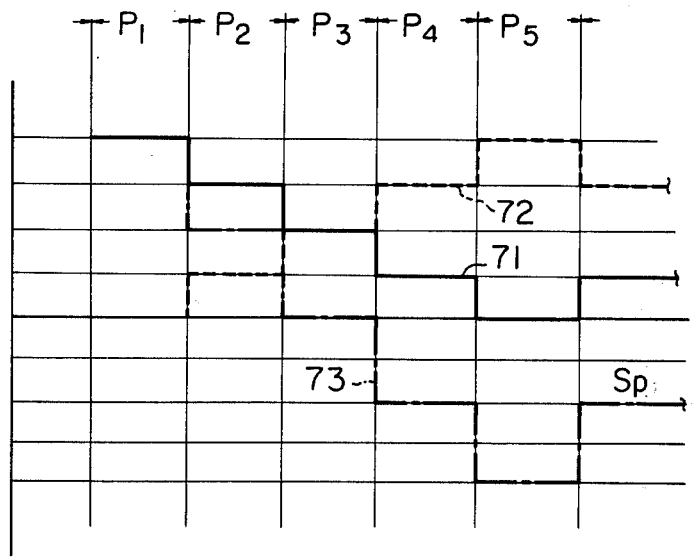
Figure 8A:
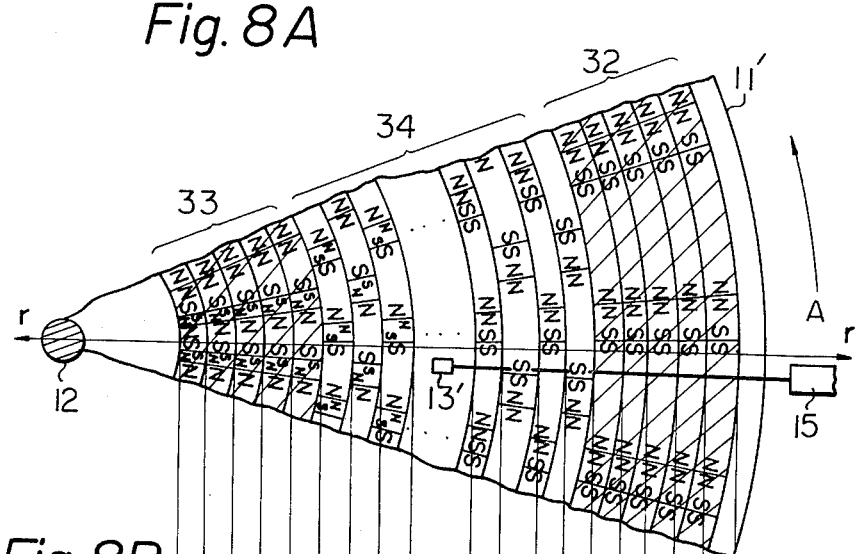
Figure 8B:
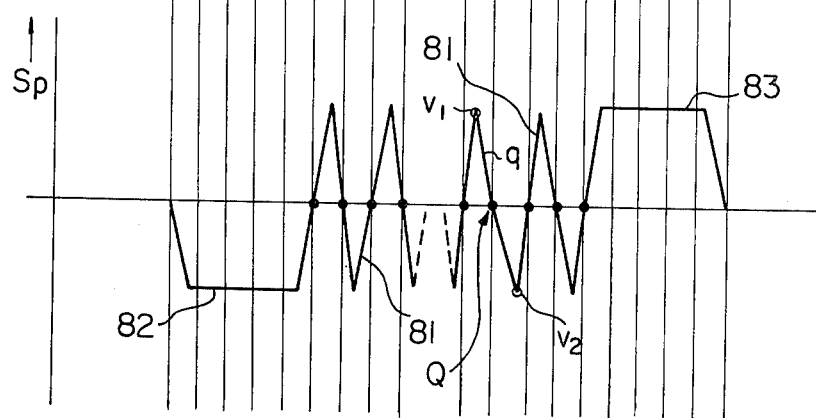
Figure 9:
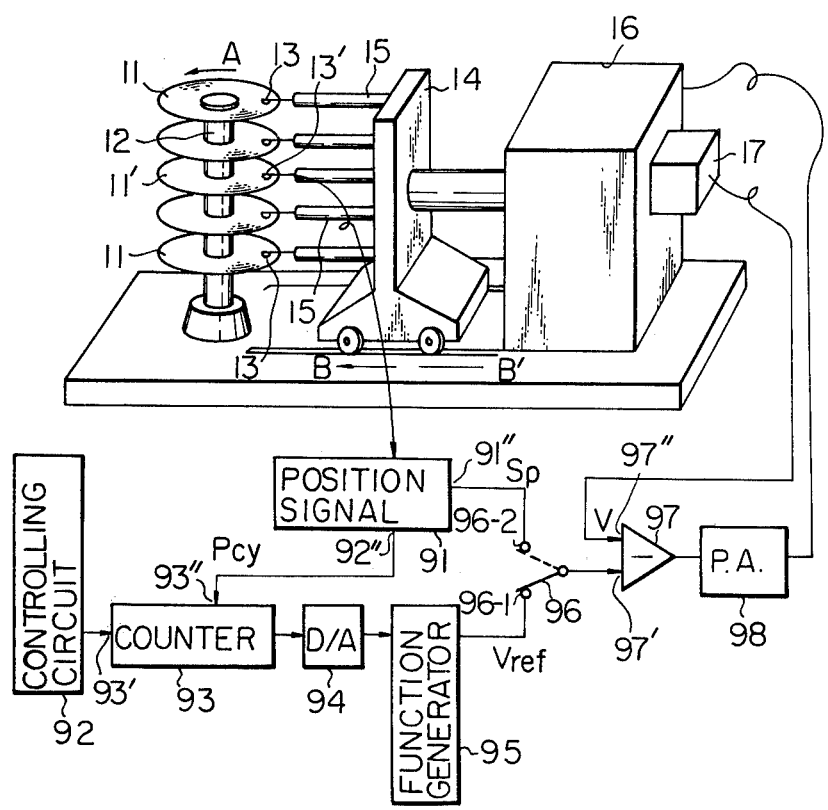
Figure 10A:
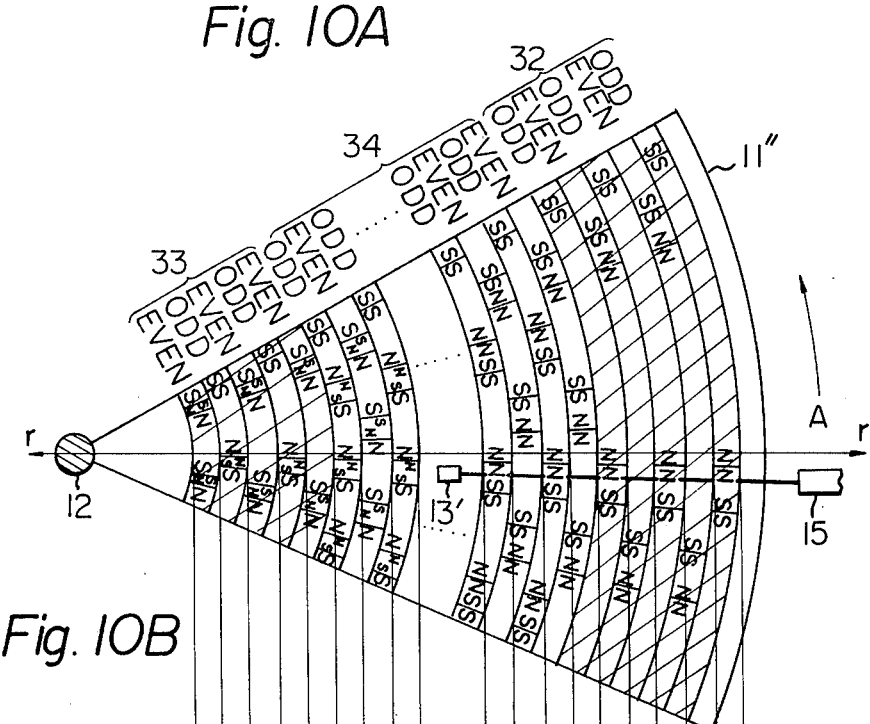
Figure 10B:
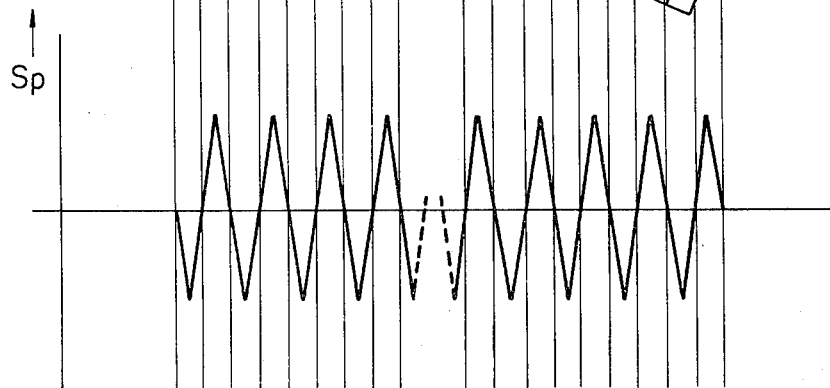
Figure 13:
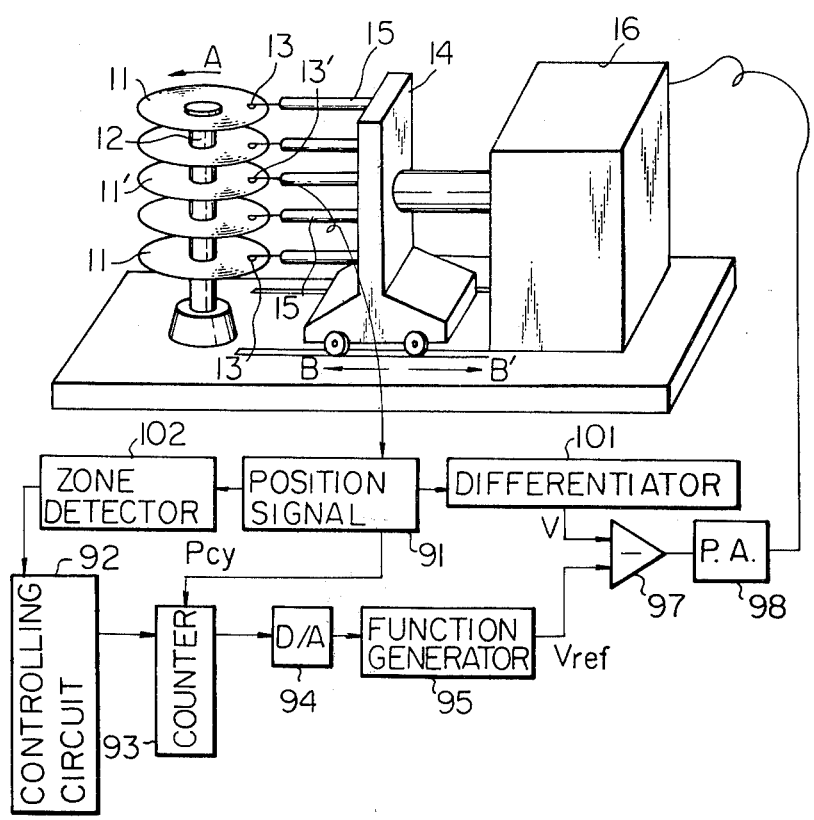
Figure 14:
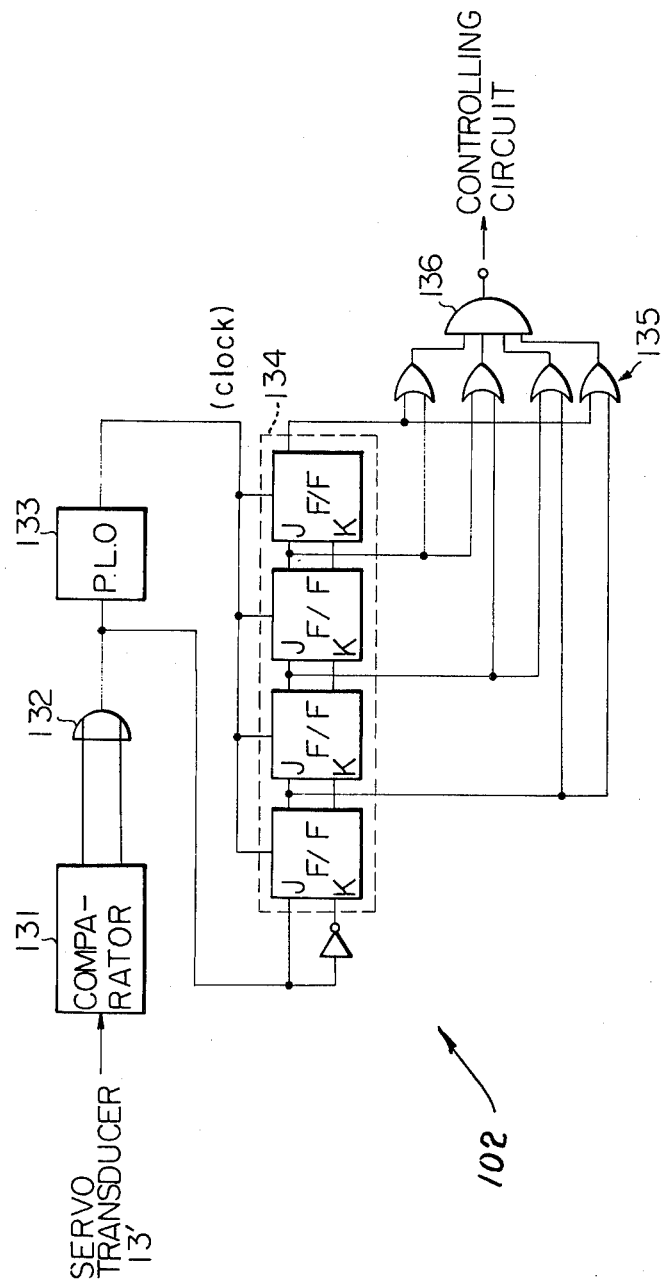

FIG. 5 $(p_1)$ through FIG. 5 $(p_5)$, respectively show servo signals produced from the servo transducer when it is located above positions indicated by the symbols $P_1$ through $P_5$ in FIG. 3;

FIG. 6 shows a block diagram of a conventional demodulation circuit of position signals;

FIG. 7 illustrates peak voltage produced respectively by the odd peak-hold circuit, even peak-hold circuit and subtractor, which circuits are shown in FIG. 6;

FIG. 8A is a plan view, partially cut away, of the conventional servo disk 11';

FIG. 8B illustrates the curve of the position signal $S_p$ produced in accordance with the arrangement of odd and even tracks shown in FIG. 8A;

FIG. 9 is a diagrammatic illustration of a typical magnetic disk storage apparatus;

FIG. 10A is a plan view, partially cut away, of the servo disk 11" according to the present invention;

FIG. 10B illustrates the curve of the position signal $S_p$ produced in accordance with the arrangement of odd and even tracks shown in FIG. 10A;

FIG. 11 is a plan view, partially cut away, showing the magnetization pattern of the servo disk 11" according to the present invention;

FIG. 12(1) through FIG. 12(4) illustrates respective servo signals provided from the servo transducer when said servo transducer is on the four different portions: above the odd track; above the even track; above the odd' track; and above the even' track shown in FIG. 11;

FIG. 13 is a diagrammatic illustration of the magnetic disk storage apparatus according to the present invention;

FIG. 14 is a block diagram of another example of the zone detector 102 shown in FIG. 12; and, FIG. 15(1) through FIG. 15(7) are timing charts for understanding the operation of the zone detector 102 shown in FIG. 14.

Figure 1:
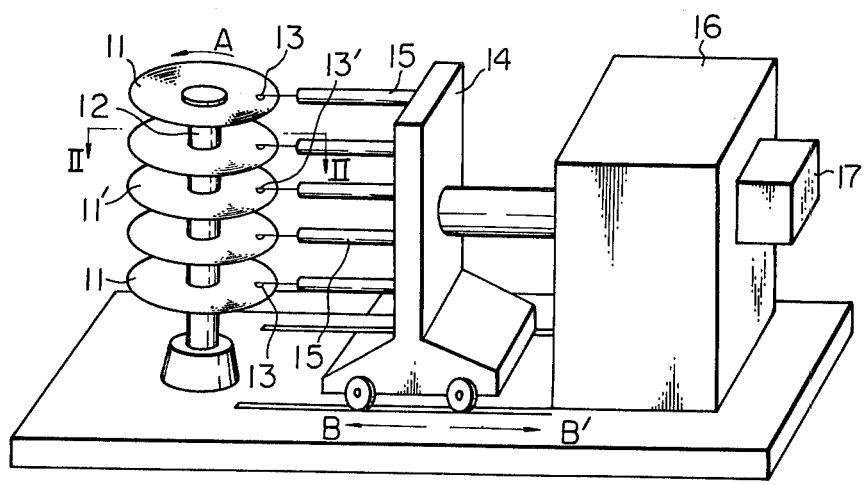
FIG. 1 is a perspective view schematically illustrating the mechanical portion of a typical magnetic disk storage apparatus.

FIG. 1 is a perspective view schematically illustrating a mechanical portion of a typical magnetic disk storage apparatus. In FIG. 1, reference numerals 11 and 11' indicate a plurality of magnetic disks, 11' especially indicating a servo disk and the other disks being data storage disks. The stack of disks is fixed on a rotating shaft 12 and rotated in the direction of arrow A, which shaft is rotated by an electric motor (not shown) at a constant high speed. The numerals 13 and 13' indicating transducers, 13' especially indicates a servo transducer which cooperates electromagnetically with the servo disk 11'. The transducers 13 and 13' are supported by a carriage 14 by means of corresponding arms 15 and are moved by the carriage 14 forward and backward in directions of arrows B and B'. Accordingly, the transducers 13 and 13' can travel in a radial direction relative to, and slightly above, the corresponding magnetic disks 11 and 11'. In each of the disks 11, a great amount of data is stored in a plurality of circular tracks (not shown), which tracks are arranged concentrically on the disk. When a control unit (not shown) commands the read-out of some data from a particular track of a particular disk 11 or the writing of some data onto a particular track of a particular disk 11, the corresponding transducer 13 is moved to the desired track. Thereafter, the corresponding transducer 13 can read out data from the desired track or write some data onto the desired track. The above-mentioned movement of the transducers is accomplished by a linear motor 16 via the carriage 14 and arms 15. The positioning of the corresponding transducer to the desired track on the desired disk is made under the control of servo information stored in a plurality of tracks in the servo disk 11', wherein servo information is read out by the servo transducer 13'. The servo information thus read out is supplied to a controlling circuit (not shown), and the controlling circuit further controls the linear motor 16 so as to locate and hold the corresponding transducer on the desired track. The numeral 17 indicates a tachometer which detects a moving speed of the transducers, and said detected moving speed is also supplied to the controlling circuit in order to move the transducers with a predetermined control speed.

Figure 2:
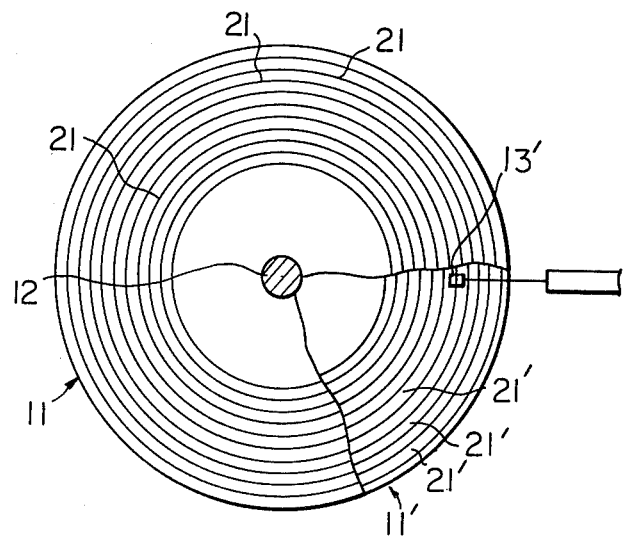
FIG. 2 is a plan view of magnetic disks seen from the arrow II in FIG. 1, where the upper magnetic disk is partially cut away.

FIG. 2 is a plan view of magnetic disks seen from the arrow II. In FIG. 2, the numeral 11 indicates the data storage disk, partially cut away, and the numeral 11' indicates the servo disk. The servo storage disk 11' is located under the data storage disk 11 at a predetermined gap distance. The numeral 12 indicates the rotating shaft. As the data storage disk 11 is partially cut away, a part of the servo storage disk 11' can be seen through the cut away portion. The data storage disk 11 has on its surface a plurality of circular tracks 21 arranged concentrically. Each of the tracks 21 stores respective data information which is used for data processing. The servo disk 11' has also on its surface a plurality of circular tracks 21' arranged concentrically. The tracks 21' store respective servo information or guard zone information. As shown in FIG. 2, each of the tracks 21' is arranged in such a manner that the track is shifted in a radial direction by a one half-track pitch with respect to the corresponding track 21. The servo transducer 13' is vertically aligned with a straight line along which the other transducers 13 are also vertically aligned as shown in FIG. 1, and the servo transducer 13' is stopped from moving and held at a desired position which resides on a boundary between the adjacent two tracks 21'. Accordingly, when the servo transducer 13' is stopped from moving and held at the desired position, the particular transducer 13 can be located right above the desired tracks.

Figure 4A:
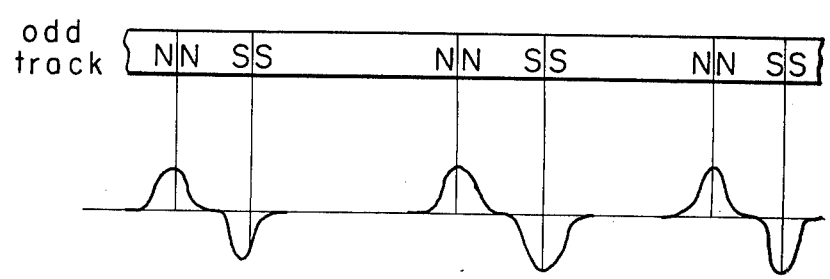
FIG. 4A illustrates the signal detected by the servo transducer on the odd track shown in FIG. 3.
Figure 4B:
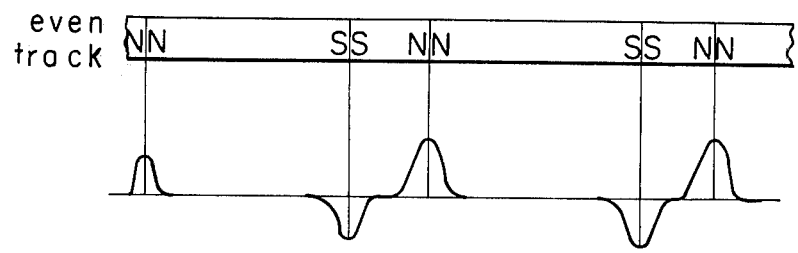
FIG. 4B illustrates the signal detected by the servo transducer on the even track shown in FIG. 3.

FIG. 3 is an enlarged plan view, partially cut away, of a conventional servo storage disk 11'. In FIG. 3, the numerals 32 and 33 represent, respectively, an outer guard zone and an inner guard zone. The outer guard zone 32 is comprised of a plurality of tracks 21', and the inner guard zone 33 is also comprised of a plurality of tracks 21'. The numeral 34 represents a servo track zone. The servo track zone 34 is comprised of a plurality of tracks 21' and is located between the outer guard zone 32 and the inner guard zone 33. As seen in FIG. 3, the tracks 21' are classified into two kinds of tracks. The first kind of tracks is called an odd track and the second kind of track is called an even track. The outer guard zone 32 is comprised of a plurality of odd tracks and the inner guard zone 33 is comprised of a plurality of even tracks. The servo track zone 34 is comprised of a great number of odd tracks and even tracks, where the odd track and even track are arranged alternately. In each of the odd tracks, in this example, a plurality of magnetization areas is formed on the disk 11', and each of the magnetization areas has a magnetization pattern of $N \rightarrow N \rightarrow S \rightarrow S$ in the direction of arrow A. In each of the even tracks, in this example, a plurality of magnetization areas is formed on the disk 11', and each of the magnetization areas has a magnetization pattern of $S \rightarrow S \rightarrow N \rightarrow N$ in the direction of arrow A. FIG. 4A illustrates the magnetization and output signals created by and along the odd track shown in FIG. 3, and FIG. 4B illustrates magnetization and output signals created along the even track shown in FIG. 3.

In FIG. 3, when the servo transducer 13' is located at a position indicated by the reference symbol $P_1$ and the servo storage disk 11' is rotated at a constant high speed in the direction of arrow A, the servo transducer 13' produces cyclic waves according to the magnetization of the odd track shown in FIG. 4A. The cyclic waves are also illustrated in line ($p_1$) of FIG. 5. When the servo transducer 13' is located at a position $P_5$, the servo transducer 13' produces cyclic waves according to the magnetization of the even track shown in FIG. 4B. The cyclic waves are also illustrated by broken lines in line ($p_5$) of FIG. 5. When the servo transducer 13' is located at positions $P_2$, $P_3$ or $P_4$, the servo transducer 13' produces waves illustrated, respectively, in examples ($p_2$), ($p_3$) and ($p_4$) of FIG. 5. The waves shown in lines ($p_2$), ($p_3$) and ($p_4$) are formed by summing one of the cyclic waves illustrated by the solid lines with another one of the cyclic waves illustrated by broken lines. It should be noted that when, for example, the servo transducer 13' is largely facing to the odd track, the amplitude of each of the waves illustrated by solid line is then larger than that of each one of the cyclic waves illustrated by the broken lines.

FIG. 6 shows the block diagram of a conventional position signal demodulating circuit 91. The position signal demodulating circuit 91 first receives the waves shown in FIG. 5 and then produces a position signal. In the position signal demodulating circuit 91, the numeral 61 indicates a head core of the servo transducer 13' (FIG. 1). The waves derived from the head core 61 shown in FIG. 5, are amplified by an amplifier 62 and then applied to a sampling circuit 63. The sampling circuit 63 detects an allocation of the waves illustrated by the solid lines shown in FIG. 5 and triggers an odd peak-hold circuit 64. The odd peak-hold circuit 64 sequentially holds the peak amplitude of the waves. The sampling circuit 63 also detects an allocation of the waves illustrated by the broken lines shown in FIG. 5 and triggers an even peak-hold circuit 65. The even peak-hold circuit 65 sequentially holds the peak amplitude of the waves. The output signals from the odd peak-hold circuit 64 and the even peak-hold circuit 65 are applied to a subtractor 66. The subtractor 66 outputs the position signal Sp.

FIG. 7 illustrates waves provided from the odd peak-hold circuit 64, the even peak-hold circuit 65 and the subtractor 66, where the symbols $P_1$ through $P_5$ correspond to respective positions shown in FIG. 5, at which respective positions the servo transducer 13' is located. In FIG. 7, a stepwise wave illustrated by the solid line 71 indicates an output signal transmitted from the odd peak-hold circuit 64. A stepwise wave illustrated by the broken line 72 indicates an output signal transmitted from the even peak-hold circuit 65. A stepwise wave illustrated by the dot-dash line 73 indicates the position signal Sp.

FIG. 8A is a plan view, partially cut away, of the conventional servo storage disk 11', which plan view corresponds to the plan view of FIG. 3. When the servo transducer 13' traverses on the disk 11' in a radial direction of arrow r at the same time when the disk 11' is being rotated in a direction of arrow A, the position signal demodulating circuit (shown in FIG. 6) produces the position signal. The position signal includes a plurality of triangular waves and two trapezoidal waves formed in accordance with the arrangement of odd and even tracks. Said triangular waves and the trapezoidal waves are shown in FIG. 8B, where the triangular waves are referenced by the numeral 81 and the trapezoidal waves are referenced by the numerals 82 and 83.

FIG. 9 is a diagrammatic illustration of a typical magnetic disk storage apparatus. In FIG. 9, the mechanical elements 11 through 17 are as already explained by referring to FIG. 1, and the mechanical elements 11 through 17 are driven under the control of the electronic elements 91 through 98. The electronic element 91 indicates the position signal demodulating circuit which is comprised of the electronic circuits 62 through 66 shown in FIG. 6. The first output 91" of the circuit 91 produces the above-mentioned position signal $Sp$ and the second output 92" of the circuit 91 produces cylinder pulses $P_{cy}$ by means of a comparator (not shown). A cylinder pulse $P_{cy}$ is produced every time the servo transducer 13' crosses a track 21'. The number of tracks 21' to be intersected is provided from the controlling circuit 92 and said number is then set in a difference counter 93 through a first input 93'. Said number of tracks 21' is subtracted by the number of cylinder pulses $P_{cy}$ one by one, which cylinder pulses $P_{cy}$ are applied through a second input 93". Then, the difference counter 93 provides a digital signal which always expresses the number of tracks remaining to be intersected. The digital signal from the difference counter 93 is converted into a corresponding analog signal by means of a D/A converter 94. The numeral 95 indicates a function generator which modifies the waveform of said D/A converter 94 into a suitable velocity curve of the control speed. Thus, the function generator 95 provides a predetermined control speed signal $V_{ref}$ with which the carriage 14 and also the transducers 13 and 13' have to be moved. First, the switch 96 cooperates with a contact 96-1, and then the predetermined control speed $V_{ref}$ is applied to a first input 97' of a subtractor 97. Meanwhile, the actual moving speed of the carriage 14 and also of the transducers 13 and 13' is detected by the tachometer 17, and the detected speed signal V is then applied to a second input 97" of the subtractor 97. The subtractor 97 produces a deviation signal which indicates a deviation between the predetermined control speed signal $V_{ref}$ and the actual speed signal V. The deviation signal is amplified by a power amplifier 98 and fed back to the linear motor 16. If the level of the signal V is lower than that of the signal $V_{ref}$, the power amplifier 98 may provide positive power to the linear motor 16 and, if the level of the signal V is higher than that of the signal Vref, the power amplifier may provide negative power to the linear motor 16. Thus, the transducers 13 and 13' are coarsely transferred close to the desired position to be stopped. Accordingly, in FIG. 8B, if the desired position is a point Q for example, the amplitude of the position signal Sp changes between the amplitudes $v_1$ and $v_2$ along the line $q$. At this time, in FIG. 9, the content of difference counter 93 should be zero and the condition of the switch 96 has changed in which the switch 96 cooperates with a second contact 96-2. In this case, the subtractor 97 produces a deviation signal which indicates a deviation between the actual position of the transducers and the desired position Q. The deviation signal is fed back to the linear motor 16 through the power amplifier 98, thereby the transducers are finely located on the desired position Q.

In the conventional magnetic disk storage apparatus shown in FIG. 9, the detection of the moving speed of the transducers 13 and 13' is made by utilizing the mechanical tachometer 17. However, as mentioned previously, the tachometer 17 has some disadvantages. Accordingly, in recent years, it has been proposed to detect the actual moving speed of the transducers by only utilizing the position signal Sp without using the tachometer. The moving speed of the transducers 13 and 13' can be obtained, as previously mentioned, by differentiating the position signal $S_p$. However, there is a problem that, although it is possible to obtain said moving speed by differentiating the position signal $S_p$ when the servo transducer 13' is traveling within the servo track zone 34 (see FIG. 8A), it is impossible to obtain the moving speed by differentiating the position signal $S_p$ when the servo transducer 13' is traveling within the outer guard zone 32 or the inner guard zone 33 (see FIG. 8A). This is because, when the servo transducer 13' travels within the servo track zone 34, since the position signal $S_p$ is provided as triangular waves 81 (see FIG. 8B), the moving speed can be obtained by detecting the gradient of each of the triangle waves 81, and such gradient can be obtained by differentiating each of the triangular wave. However, when the servo transducer 13' travels within the outer guard zone 32 or the inner guard zone 33, since the position signal $S_p$ is provided as trapezoidal waves 82 or 83 (see FIG. 8B), the moving speed cannot be obtained by differentiating each of the trapezoidal waves. This is because, the differentiated value of each trapezoidal wave becomes zero.

In the present invention, the outer guard zone 32 is provided with a plurality of odd and even tracks arranged in alternation as shown in FIG. 10A, and the inner guard zone 33 is also provided with a plurality of odd and even tracks arranged in alternation as shown in FIG. 10A. FIG. 10A is a plan view, partially cut away, of the servo storage disk 11" according to the present invention, which plan view corresponds to the plan view of FIG. 8A. When the servo transducer 13' traverses on the disk 11" in a radial direction of arrow r and, at the same time the disk 11" is rotated in a direction of arrow A, the position signal demodulating circuit 91 (see FIGS. 6 and 9) produces triangular waves in the servo track zone 34 and also in the outer and inner guard zones 32 and 33. The triangular waves shown in FIG. 10B are produced in accordance with the arrangement of the odd and even tracks. As apparent from FIG. 10B, since the triangular waves can be obtained not only when the servo transducer 13' is traveling in the servo track zone 34, but also when the servo transducer 13' is traveling in the outer guard zone 32 and in the inner guard zone 33, it is therefore possible to detect the moving speed of the transducers 13 and 13' by differentiating the position signal $S_p$ not only when the servo transducer 13' is traveling in the servo track zone 34, but also when the servo transducer 13' is traveling in the outer guard zone 32 and the inner guard zone 33.

However, there is a problem in that since the position signal demodulating circuit 91 (FIG. 9) produces the same triangular wave during that time when the servo transducer 13' is traveling from the outer guard zone 32 to the inner guard zone 33 through the servo track zone 34, it is therefore impossible to detect whether the servo transducer 13' is traveling IN the servo track zone 34 or IN the guard zones 32, 33. Consequently, it is impossible to identify the absolute track, namely the zero position, in the servo track 34, or to identify the end servo track therein. As a result, it is impossible to count the number of servo tracks across which the servo transducer 13' has traveled.

Accordingly, it is necessary to know at which zone the servo transducer 13' is located. In the present invention, all the zones 32, 33 and 34 are, basically, provided with a plurality of odd and even tracks arranged alternately; however, the odd and even tracks of the guard zones (32, 33) have magnetization patterns a little bit different from those of the servo track zone 34.

As shown in FIG. 11, the magnetization patterns of the odd and even tracks arranged in the guard zones (32, 33) are different from the magnetization pattern of the odd and even tracks arranged in the servo track zone 34. FIG. 11 is an enlarged plan view, partially cut away, showing an example of the servo storage disk 11" according to the present invention. In FIG. 11, the number of magnetization areas of each odd track in the guard zones (32, 33), namely the odd' track, is less than the number of magnetization areas of each odd track in the servo track zone 34. Similarly, the number of magnetization areas of each even track in the guard zones (32, 33), namely the even' track, is less than the number of magnetization areas of each even track in the servo track zone 34. Accordingly, the servo signal which is produced when the servo transducer 13' is located above the odd or even track, is different from the servo signal which is produced when the servo transducer 13' is located above the odd' or even' track. This will be clarified by the waveforms of the servo signal shown in FIG. 12. In FIG. 12, the waveforms in line (1) indicate the servo signal which is produced when the servo transducer 13' is located right above one of the odd tracks in the servo track zone 34, which waveforms are the same as those shown in line ($p_1$) in FIG. 5. The waveforms in line (2) indicate the servo signal which is produced when the servo transducer 13' is located right above one of the even tracks in the servo track zone 34, which waveforms are the same as those shown in line ($p_5$) in FIG. 5. The waveforms in line (3) indicate the servo signal which is produced when the servo transducer 13' is located right above one of the odd' tracks in the guard zone 32 or 33. The waveforms in line (4) indicate the signal which is produced when the servo transducer 13' is located right above one of the even' tracks in the guard zone 32 or 33. Thus, information concerning whether the servo transducer 13' is traveling in the servo track zone 34 or in the guard zone 32 (or 33) can easily be obtained by surveying these patterns (1), (2) or (3), (4) in FIG. 12.

FIG. 13 is a diagrammatic illustration of a magnetic disk storage apparatus according to the present invention. The mechanical elements 11 through 16 and the electronic elements 91 through 98 are the same as those shown in FIG. 9. It should be noted that a differentiator 101 is newly employed instead of the tachometer 17 shown in FIG. 9. The output signal V from the differentiator 101 indicates the actual moving speed of the transducers 13 and 13' by differentiating the position signal $S_p$. Furthermore a zone detector 102 is newly employed for detecting whether the servo transducer 13' is in the servo track zone 34 or in the guard zone 32 (or 33). The detected zone information is supplied to the controlling circuit 92. The zone information is further utilized for preventing the transducers 13 and 13' from colliding with the rotating shaft 12 or running away from the disks 11 and 11". Further, when the servo transducer 13' loses its position on the servo track zone during the positioning operation of the transducers 13 and 13', the transducers 13 and 13' are forced to return to the outer guard zone (or inner guard zone), and then the positioning operation is started again at the correct position.

FIG. 14 is a block diagram of an example of the zone detector 102 shown in FIG. 12. In FIG. 14 the zone detector 102 is comprised of a comparator 131 which receives a servo signal from the servo transducer 13', an OR-gate circuit 132, a phase-locked oscillator 133, a 4-bit shift register 134, OR-gate circuits 135 and an AND-gate circuit 136. When the servo transducer 13' travels in the servo track zone, the comparator 131 produces servo pulses shown in line (1), (2) or (3) of FIG. 15 wherein the odd and even servo pulses are shown in lines (1) and (2), respectively. Similarly, when the servo transducer 13' travels in the guard zone, the comparator 131 produces servo pulses shown in line (4), (5) or (6) of FIG. 15 wherein the odd' and even' servo pulses are shown in lines (4) and (5), respectively. The phase-locked oscillator produces pulses in synchronism with the servo pulses shown in lines (3) wherever the servo transducer is located. The phase-locked oscillator can produce the synchronizing pulses as shown in line (7) in FIG. 15 not only when the servo pulses shown in line (3) are applied thereto, but also when the servo pulses shown in line (6) are applied to said oscillator. When the servo transducer 13' travels in the servo track zone, especially above the odd track, the output of the shift register 134 becomes (1010) or (0101). When the servo transducer 13' travels in the servo track zone, especially above the even track, the output of the shift register 134 becomes (1010) or (0101). When the servo transducer 13' travels in the servo track zone, especially between the odd and even track, the output of the shift register 134 becomes (1111). As a result, the AND-gate circuit 136 produces a "1" level pulse which indicates that the servo transducer 13' is traveling in the servo track zone. Contrary to the above, when the servo transducer 13' travels in the inner or outer guard zone, especially above the odd' track, the output of the shift register 134 becomes (1000), (0100), (0010) or (0001). When the servo transducer 13' travels in the inner or outer guard zone, especially above the even' track, the output of the shift register 134 becomes (1000), (0100), (0010) or (0001). When the servo transducer 13' travels in the inner or outer guard zone, especially between the odd' and even' track, the output of the shift register 134 becomes (1100), (0110), (0011) or (1001). As a result, the AND-gate circuit 136 produces a "0" level pulse which indicates that the servo transducer 13' is traveling in the inner or outer guard zone.

What is claimed is:

1. A magnetic disk storage apparatus comprising a plurality of data storage disks and a servo disk which are all rotated at a constant high speed, a plurality of data transducers, each of which electromagnetically cooperates with a respective one of said data storage disks, and a servo transducer which electromagnetically cooperates with said servo disk, a linear motor which moves said data transducers and said servo transducer with respect to said storage disks and said servo disk, respectively, and a controlling circuit which controls said linear motor so as to move said servo transducer, together with said data transducers, to a desired position relative to said servo disk in accordance with a command, wherein said servo disk is provided with, on its surface, an inner guard zone which can provide inner guard information to said controlling circuit when said servo transducer is located thereabove, an outer guard zone which can provide outer guard information to said controlling circuit when said servo transducer is located thereabove, and a servo track zone which can provide both moving speed information concerning the moving speed of said servo transducer and positioning information concerning the positioning of said servo transducer to said controlling circuit when the servo transducer is located above said servo track zone, characterized in that at least one of said inner guard zone and said outer guard zone can further provide moving speed information of said servo transducer to said controlling circuit when said servo transducer is located thereabove.

2. An apparatus as set forth in claim 1, wherein said moving speed information being provided by at least one of said inner and outer guard zones, is stored in said servo disk by forming a plurality of odd tracks and a plurality of even tracks arranged alternately and concentrically relative to each other in an arrangement which is the same as that of odd and even tracks formed alternately and concentrically relative to each other in said servo track zone.

3. An apparatus as set forth in claim 2, wherein said controlling circuit includes position signal forming circuit means contained in said controlling circuit for producing a position signal, based on said moving speed information read out from the servo transducer, and means responsive to said position signal for differentiating said position signal whereby to obtain said moving speed of said servo disk.

4. An apparatus as set forth in claim 3, wherein a plurality of magnetization areas is formed in and along said odd and even tracks, respectively, of at least one of said inner and outer guard zones with predetermined magnetization patterns which are different from magnetization patterns of said servo track zone.

5. An apparatus as set forth in claim 4, wherein said controlling circuit includes a zone detector for detecting the difference between said magnetization patterns of said servo track zone and said magnetization patterns of said guard zone, whereby to determine which zone said servo transducer is above.

6. An apparatus as set forth in claim 5, wherein said zone detector comprises a servo pulse supplying circuit having an input connected to said servo transducer for detecting the occurrences of said magnetization areas, and having an output for supplying servo pulses in accordance with the occurrences of said magnetization areas; a phase locked oscillator for receiving said servo pulses and responsive thereto for providing an oscillator output as clock pulses; an N-bit shift register for receiving said clock pulses and responsive thereto for providing successive N-bit digital outputs indicating which zone said servo transducer is above; and a logic circit for decoding said N-bit output of said shift register to provide a control signal to said controlling circuit indicating which zone said servo transducer is above.

7. An apparatus as set forth in claim 1, wherein said controlling circuit includes position signal forming circuit means contained in said controlling circuit for producing a position signal, based on said moving speed information read out from the servo transducer, and means responsive to said position signal for differentiating said position signal whereby to obtain said moving speed of said servo disk.

8. An apparatus as set forth in claim 2, wherein a plurality of magnetization areas is formed in and along said odd and even tracks, respectively, of at least one of said inner and outer guard zones with predetermined magnetization patterns which are different from magnetization patterns of said servo track zone.

9. An apparatus as set forth in claim 8, wherein said controlling circuit includes a zone detector for detecting the difference between said magnetization patterns of said servo track zone and said magnetization patterns of said guard zone, whereby to determine which zone said servo transducer is above.

10. An apparatus as set forth in claim 9, wherein said zone detector comprises a servo pulse supplying circuit having an input connected to said servo transducer for detecting the occurrences of said magnetization areas, and having an output for supplying servo pulses in accordance with the occurrences of said magnetization areas; a phase locked oscillator for receiving said clock pulses and responsive thereto for providing successive N-bit digital outputs indicating which zone said servo-transducer is above; and a logic circuit for decoding said N-bit output of said shift register to provide a control signal to said controlling circuit indicating which zone said servotransducer is above.

11. An apparatus as set forth in claim 1, wherein a plurality of magnetization areas is formed in and along said odd and even tracks, respectively, of at least one of said inner and outer guard zones with predetermined magnetization patterns which are different from magnetization patterns of said servo track zone.

12. An apparatus as set forth in claim 11, wherein said controlling circuit includes a zone detector for detecting the difference between said magnetization patterns of said servo track zone and said magnetization patterns of said guard zone, whereby to determine which zone said servo transducer is above.

13. An apparatus as set forth in claim 12, wherein said zone detector comprises a servo pulse supplying circuit having an input connected to said servo transducer for detecting the occurrences of said magnetization areas, and having an output for supplying servo pulses in accordance with the occurrences of said magnetization areas; a phase locked oscillator for receiving said servo pulses and responsive thereto for providing an oscillator output as clock pulses; an N-bit shift register for receiving said clock pulses and responsive thereto for providing successive N-bit digital outputs indicating which zone said servo transducer is above; and a logic circuit for decoding said N-bit output of said shift register to provide a control signal to said controlling circuit indicating which zone said servo transducer is above.

14. In a magnetic disk storage apparatus which includes a plurality of storage disks and a servo disk arranged in parallel along a rotational axis, a plurality of data transducers, one for each storage disk, a servo transducer which electromagnetically cooperates with said storage disks and said servo disk, respectively, to derive information therefrom, and a linear motor for moving said data transducers and said servo transducer in unison through various positions with respect to said storage disks and said servo disk, respectively, wherein said servo disk has an inner guard zone storing inner guard information, an outer guard zone storing outer guard information, and a servo track zone providing servo information which includes both moving speed information and positioning information; a control circuit for utilizing said servo information to control said linear motor and thus the positioning of said data transducers and said servo transducer, said control circuit comprising:

position signal deriving means responsive to said servo information received from said servo transducer for producing outputs indicating the type of zone said servo transducer is above and indicating the position of said servo transducer within said zone, respectively;

differentiating means for performing differentiation of said position-indicating output to derive a further output representing the actual moving speed of said servo transducer;

reference deriving means responsive to said type-of-zone-indicating output and said position-indicating output for deriving therefrom a reference output representing a predetermined control speed of said servo transducer; and comparison means for comparing said further output of said differentiating means with said reference output of said reference deriving means to produce a control signal for controlling said linear motor.

15. An apparatus as set forth in claim 14, wherein said position signal deriving means includes a zone detector responsive to said servo information for issuing respective signals indicating that said servo transducer is above said inner guard zone, said outer guard zone, and said servo track zones, respectively.

16. An apparatus as set forth in claim 15, wherein said reference deriving means includes a control counting circuit responsive to said respective signals of said zone detector and to said position-indicating information of said position signal deriving means for providing a digital count of the number of tracks of said servo disk to be crossed.

17. An apparatus as set forth in claim 16, wherein said reference deriving means further includes an analog converter for converting said digital count to an analog output, and a function generator responsive to said analog output for providing said reference output.

18. An apparatus as set forth in claim 15, wherein said servo information is stored in said servo disk by forming a plurality of odd and even tracks arranged alternately and concentrically relative to each other and wherein a plurality of magnitization areas is formed in and along said odd and even tracks, respectively, of at least one of said inner and outer guard zones with predetermined magnetization patterns which are different from magnetization patterns of said servo track zone, and wherein said zone detector comprises a servo pulse supplying circuit having an input connected to said servo transducer for detecting the occurrences of said magnetization areas, and having an output for supplying servo pulses in accordance with the occurrences of said magnetization areas; a phase locked oscillator for receiving said servo pulses and responsive thereto for providing an oscillator output as clock pulses; an N-bit shift register for receiving said clock pulses and responsive thereto for providing successive N-bit digital outputs indicating which zone said servo transducer is above; and a logic circuit for decoding said N-bit output of said shift register to provide a control signal to said controlling circuit indicating which zone said servo transducer is above.

* * * * *

UNITED STATES PATENT AND TRADEMARK OFFICE
CERTIFICATE OF CORRECTION

PATENT NO. : 4,068,267
DATED : January 10, 1978
INVENTOR(S) : Yuji Inouye

It is certified that error appears in the above-identified patent and that said Letters Patent are hereby corrected as shown below:

Column 10, line 53, "circit" should be --circuit--.

Signed and Sealed this

Sixth Day of June 1978

[SEAL]

Attest:

RUTH C. MASON
Attesting Officer

DONALD W. BANNER
Commissioner of Patents and Trademarks